Feb. 4, 1941. M. M. CANNON, JR 2,230,609
SPRAY MECHANISM FOR GLASS MACHINERY
Filed Dec. 31, 1938

Witness
W. B. Thayer

Inventor
Madison M. Cannon Jr.
by Brown & Parham
Attorneys

Patented Feb. 4, 1941

2,230,609

UNITED STATES PATENT OFFICE 2,230,609

SPRAY MECHANISM FOR GLASS MACHINERY

Madison M. Cannon, Jr., West Hartford, Conn., assignor to Hartford-Empire Company, Hartford, Conn., a corporation of Delaware Application December 31, 1938, Serial No. 248,727

3 Claims. (Cl. 299—86)

This invention relates generally to improvements in spray mechanisms and more particularly to mechanisms for spraying a part or parts of glass machinery.

An object of the invention is to provide a spray mechanism for producing a spray of a suitable liquid and air in a volume which can be adjusted at will within a considerable range and which, for any given adjustment thereof, will be maintained substantially uniform even though accidental or unintended changes of substantial extent may occur in the rate of supply of the liquid to the spray mechanism.

A further object of the invention is to provide a spray mechanism of the character described which can be operated to produce a very small volume of spray when desired.

A still further object of the invention is to provide a spray mechanism of the character described which requires no relatively moving parts for its operation and which therefore is not likely to get out of order easily or become impaired in service.

A still further object of the invention is to provide a spray mechanism of the character described which is self cleaning and therefore is not likely to become clogged in service by sediment, dirt or solid matter in the liquid component of the spray.

Figure 1:
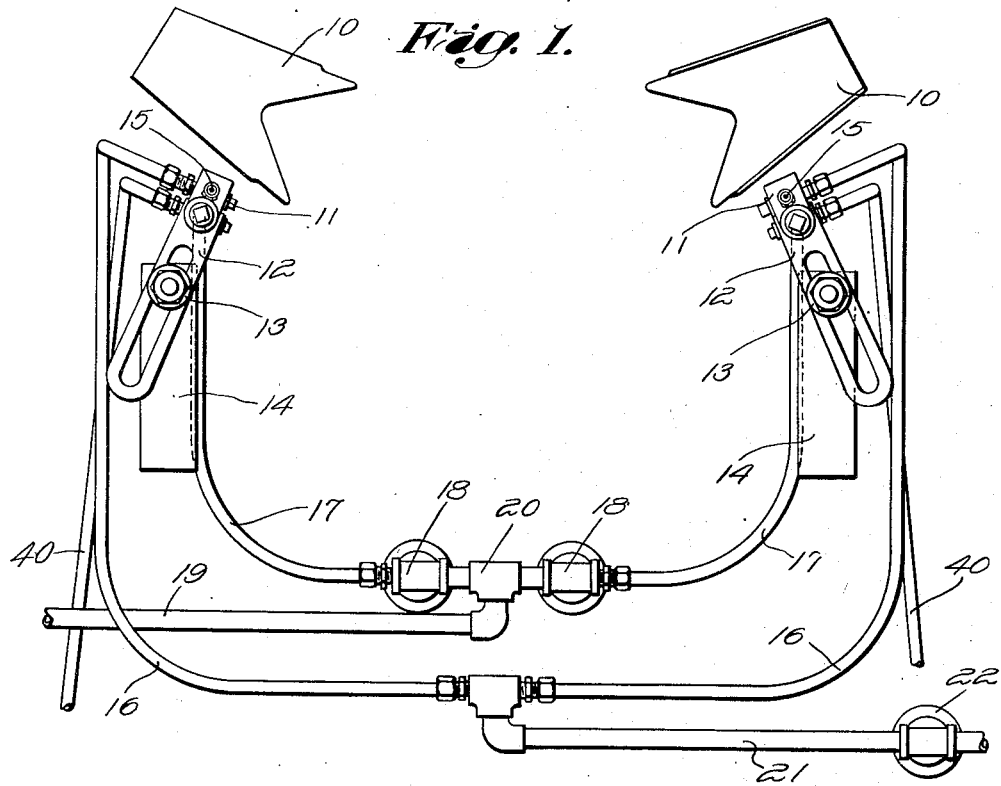
Figure 2:
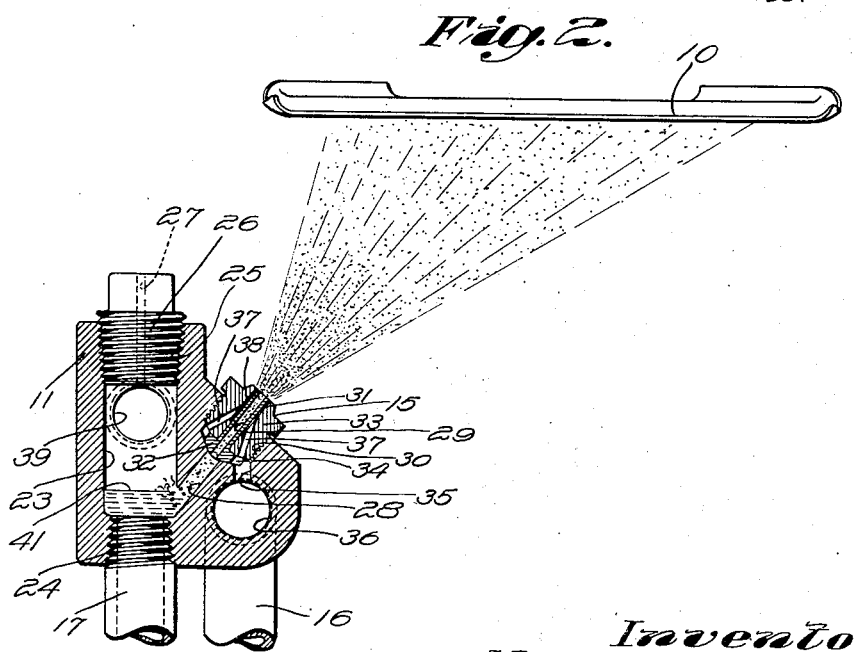

Other objects and advantages of the invention will hereinafter be pointed out or will become apparent from the following description of a practical embodiment of the invention, as illustrated in the accompanying drawing, in which:

Fig. 1 is a plan view of spray mechanism of the present invention as arranged to effect spraying of glass cutting shear blades when these blades are in their open or retracted positions, and Fig. 2 is a relatively enlarged vertical sectional view of a spray head of the present invention in position to discharge spray onto one of the glass cutting shear blades.

In Fig. 1, shear blades 10 are shown in the positions which they occupy when they have been opened or retracted after a glass cutting operation. For spraying such shear blades, I may make use of a pair of spray heads 11. Each spray head 11 may be carried by an arm 12 which is pivotally and slidably mounted, as at 13, on a support 14. Each spray head is provided with a nozzle 15, an air supply line 16 and a liquid supply line 17.

When the supporting arms 12 have been suitably adjusted, the nozzles 15 will discharge spray of liquid and air onto the blades 10. For independently adjusting the volume of liquid supplied to each of the spray heads 11, its liquid supply line 17 may be provided with an individual valve 18, such as a needle valve. The liquid supply lines 17 may be branches of a main liquid supply line 19 to which they are joined at 20.

The air lines 16 likewise may be branches of a main air supply line 21 which may be provided with a suitable valve, indicated at 22. It of course will be understood that the separate branch air supply line 16 might be provided with individual valves (not shown), if desired, and that the main liquid supply line 19 likewise may be provided with a suitable valve (not shown), if desired.

Novel structural features of each of the spray heads and the provisions which are made in accordance with the present invention for carrying out the objects thereof will now be described with particular reference to Fig. 2. As shown in that view, the spray head 11 is formed to provide a feed chamber 23 which is provided at its lower end with a liquid inlet 24 with which the liquid supply line 17 may be connected. The chamber 23 also may be provided at its upper end with an opening 25 which is normally closed by a screw threaded plug 26. This plug 26 may be provided with a central bore or passage of slight cross sectional area, as indicated at 27, for a purpose which will presently be pointed out.

The chamber 23 also is provided with an inclined outlet passage 28 which may communicate at its inner end with the lower end portion of the chamber 23 and at its outer end with a central discharge duct 29 in the nozzle 15.

The nozzle 15 may be disposed in a counterbore 30 in a laterally enlarged wall of the head at the outer end of the outlet passage 28. This nozzle may be formed in two parts, consisting of an inner tubular core 31 having an enlarged inner end portion 32 held against the bottom wall of the counterbore 30 in axial alignment with the passage 28 by an outer nozzle member 33 which has a portion in screw threaded engagement with the wall of the counterbore 30.

The outer member 33 of the nozzle is of greater diameter at its inner end than the enlarged inner end portion of the core 31 so that an annular space, indicated at 34, will be provided around the enlarged inner end portion 32 of the core 31 when the nozzle has been secured in place in the counterbore 30, as above described. This annular space 34 may serve as part of an air supply conduit, being connected by a short passage 35 in the laterally enlarged wall of the head 11 with an air intake chamber 36 to which the air supply line 16 is connected. The annular passage 34 may communicate through a plurality of oblique passages 37 in the outer member 33 of the nozzle with a narrow annular final air delivery or atomizing passage 36 which surrounds the outer end portion of the core 31. The annular final air discharge passage 36 preferably terminates at its outer end flush with and adjacent to the outer end of the duct 29 so that the air discharging therefrom will not only thoroughly break up or atomize liquid discharging from the duct 29 but will exert a suction on the duct 29 to draw therethrough liquid from the chamber 23.

The chamber 23 also has a lateral opening 39, preferably located well above the inner end of the discharge passage 28, as at the upper end of the chamber 23. Since, as hereinafter will be explained, this opening may at times serve as an overflow opening for excess liquid in the chamber 23, an overflow pipe 40 may be connected therewith, as in the assembly shown in Fig. 1.

In practice, the valve in the liquid supply line leading to the chamber 23 of the spray head may be regulated so that the liquid that is being supplied under pressure through such line will enter the chamber 23 at the proper rate to maintain therein a liquid feed body of a desirable depth, such as indicated at 41 in Fig. 2. If the level of the feed body of liquid in the chamber 23 is below or not substantially above the top of the inner end of the passage 28, air from the chamber 23 will also be drawn with the discharging liquid through the passage 28 and duct 29. The opening 39 serves as an air inlet, supplemented by the passage 27 in the plug 26. A change in the rate of supply of liquid to the chamber 23 through the line 17 will then be attended by a change in the amount of air which will be drawn through the passage 28 with the discharging liquid. Consequently, for any change of supply of liquid within a considerable range, the volume of spray will remain substantially constant although the ratio of air to liquid in the spray will be varied.

It will be understood that in the use of an ordinary liquid supply line, such as a water line, uncontrolled variations of pressure sometimes occur. In the operation of the device of the present invention, these variations may be substantial without a commensurate change of level of the feed body of liquid in the chamber 23 and without a substantial change of volume of the spray. The device therefore performs a desirable function in that it assures a substantially uniform cooling and lubrication of the part to which the spray is applied even though accidental and unintended changes occur in the volume of liquid supplied to the spray head.

The volume of spray that is to be uniformly maintained may be regulated by regulation of the valve of the liquid supply line or by regulation of the valve controlling the supply of air under pressure, or by regulation of the valves of both these lines. It may be observed, in this connection, that the final discharge liquid and air passages are of relatively small area in cross section as compared with the liquid and air inlets of the head. The intermediate passages between such inlets and the final discharge passages preferably are intermediate in size as well as in location.

In event that the supply of liquid to the chamber 23 should be increased to such an extent that level of the liquid in the chamber will rise to the level of the opening 39, overflow through the latter will ensue. This ordinarily will give notice to the operator of a condition which should be remedied by adjustment of the valve in the liquid supply line. If, however, the liquid in the chamber 23 should rise to the level of the top of the opening 39, the passage 27 in the plug 26 then would be effective to prevent siphoning of liquid through the spray head.

Any suitable liquid may be used. For spraying shear blades, water ordinarily will be employed although oil may be used for this purpose or for effecting the cooling and lubrication of any other part or parts of glass machinery. The mounting and supporting structure may be varied according to particular service requirements and one or more of the spray heads may be used in any particular setup, as required. Since the liquid supplied to the spray head may be continuously under pressure, the device is self-cleaning and clogging thereof is practically prevented.

The structural details of the spray head and associate parts may be varied from those shown in the drawing without departing from the spirit and the scope of the invention. The invention therefore is not to be limited beyond the terms of the appended claims.

What I claim is:

1. In spray mechanism for glass machinery, a spray head having a vertical chamber provided with a liquid inlet at its lower end, a combined induced air and liquid discharge passage having an intake end opening of substantial vertical extent communicating with the lower portion of the camber above the level of the liquid inlet, said chamber having a lateral opening located above the level of the intake end opening of said combined induced air and liquid discharge passage, a nozzle having a discharge duct communicating with the combined induced air and liquid discharge passage above the level of the juncture of the latter with said chamber and an atomizing air passage adjacent to the outer end portion of said discharge duct, regulable means for supplying air under pressure to said atomizing air passage, and regulable means connected with said liquid inlet for supplying liquid under pressure to said chamber at a selectively predetermined substantially constant rate adequate to maintain a feed body of liquid in said chamber to a predetermined level located between the upper and lower limits of the intake end opening of the combined induced air and liquid discharge passage when air under pressure is being supplied at a given rate to said atomizing air passage.

2. In spray mechanism for glass machinery, a spray head having a vertical chamber provided with a liquid inlet at its lower end, a combined induced air and liquid discharge passage having an intake end opening of substantial vertical extent communicating with the lower portion of the chamber above the level of the liquid inlet, said chamber having a lateral opening located above the level of the inner end of said discharge passage, a nozzle having a discharge duct communicating with the combined induced air and liquid discharge passage above the level of the juncture of the intake end of the latter with said chamber and an atomizing air passage adjacent to the outer end portion of said discharge duct, and means for supplying air under pressure to said atomizing air passage, said head also having an additional opening located at the top of said chamber and establishing communication between the atmosphere and said chamber above the level of said lateral opening.

3. In spray mechanism for glass machinery, a spray head provided with a vertical chamber having a liquid inlet at its bottom and an upwardly and outwardly inclined combined induced air and liquid discharge passage having an intake end opening of substantial vertical extent communicating with the chamber adjacent to the lower end of the latter, said chamber also having a lateral opening in a wall thereof at a level above that of the intake end opening of said discharge passage, a nozzle having a central discharge duct in line with an constituting a reduced outer extension of said inclined discharge passage and a narrow annular atomizing air passage surrounding said duct and terminating at its outer end substantially flush with and closely adjacent to the outer end of said duct, regulable means for supplying liquid continuously to the liquid inlet of said chamber at a rate which can be varied at will within a considerable range and maintained substantially constant until intentionally varied, and regulable means for supplying air under pressure to said annular atomizing air passage.

MADISON M. CANNON, Jr.